(12) United States Patent  (10) Patent No.: US 8,049,630 B2
Chao Cheng et al.  (45) Date of Patent: Nov. 1, 2011

(54) ANIMAL MANAGEMENT SYSTEM AND SCANNING ACCESS DEVICE

(75) Inventors: Jin-Hao Chao Cheng, Taoyuan Hsien (TW); Yu-Lun Ho, Hsinchu (TW)

(73) Assignees: Jin-Hao Chao Cheng, Taoyuan County (TW); Yu-Lun Ho, Hsinchu (TW)

( * ) Notice: Subject to any disclaimer, the term of this patent is extended or adjusted under 35 U.S.C. 154(b) by 387 days.

(21) Appl. No.: 12/421,625

(22) Filed: Apr. 9, 2009

(65) Prior Publication Data

US 2009/0256711 A1 Oct. 15, 2009

(30) Foreign Application Priority Data

Apr. 10, 2008 (TW) .............................. 97112952 A

(51) Int. Cl.
*G08B 23/00* (2006.01)

(52) U.S. Cl. ............... 340/573.3; 340/573.1; 340/572.1; 340/572.4; 340/572.7; 340/531; 340/539.1; 340/539.19; 119/51.02; 119/174; 119/712; 600/427; 600/443; 600/509; 600/513

(58) Field of Classification Search ............... 340/573.3, 340/573.1, 572.1, 572.4, 572.7, 531, 539.1, 340/539.19; 119/51.02, 174, 712; 600/427, 600/443, 509, 513
See application file for complete search history.

(56) References Cited

U.S. PATENT DOCUMENTS 6,847,892 B2 * 1/2005 Zhou et al. .................... 701/213
7,321,310 B2 * 1/2008 Curkendall et al. ....... 340/573.3

* cited by examiner

*Primary Examiner* — Tai T Nguyen

(57) ABSTRACT

An animal management system and scanning access device are disclosed. The scanning access device accesses RFID label disposed on/in animal body, and the information of the accessed RFID label is subsequently processed and transmitted to the animal management system via a communication transmission module for comparison. The scanning access device includes a first access module for accessing the RFID label disposed on/in animal body, an interface for the first access module to be coupled thereto and receiving the information of the RFID label accessed by the first access module, an input module for receiving operation message, a processing module for processing the information of the RFID label received by the interface and/or the operation message received by the input module, and a transmitting/receiving module for transmitting the processed information obtained from the processing module via the communication transmission module and/or receiving another information transmitted by the communication transmission module.

20 Claims, 4 Drawing Sheets

ANIMAL MANAGEMENT SYSTEM AND SCANNING ACCESS DEVICE

BACKGROUND OF THE INVENTION

1. Field of the Invention

This invention generally relates to animal management systems and scanning access devices, and more specifically, to an animal management system and scanning access device capable of accessing an RFID label disposed on/in animal body for performing management procedure.

2. Description of Related Art

Chips implanted in family pets are originally developed by western developed nations for achieving objective of reducing stray animal number and further lessening society cost and social problems caused by stray animals. In addition, a complete domestic family pet registration and management system can be established by implanting chip inside animal bodies, thereby efficiently controlling domestic pet number and supervising rabies vaccination and inspection on domestic dogs, and then preventing rabies epidemic and other similar situation from happening.

Pet chips are mainly implanted inside pets such as dogs and cats, the chip is encapsulated inside a biochemical glass tube compatible to animal tissue, a microchip is numbered and registered, size of the microchip is about 13 mm×2 mm, and is capable of staying inside animal body for many ten years, far longer than general animal life. The implanting location of chip is at "right in the center of shoulder blade at animal back" according to international standard specification. The chip is mostly unlikely to slip away if implanted right in the center of the shoulder blade. In addition, the chip can also be worn by the animal in a collar, e.g. around the animal neck, and the microchip is embedded inside the collar.

Nowadays, many nations have adopted a chip implantation program on animals and also have been supervising animal vaccination and inspection by using scanner device. However, the vaccination and inspection system or animal management system is not yet well established. Furthermore, in a situation of insufficient equipments while carrying out the program, each local organization is incapable of reaching a projected goal pertaining to animal management. For instance, chip information accessed by the scanner device can only be saved in memory of the scanner device but not immediately transmitted back to animal management system, therefore animal management personnel cannot be immediately informed of the animal status. Besides, the prior scanner device must be applied closely to animal body in order to access chip information effectively, and apparently scanning the chip of a fierce animal is commonly very dangerous for animal management personnel, unavoidably causing animal management personnel to be scared and difficulty in operation.

Hence, how to establish a perfect animal management system and device, providing convenient methods of vaccination and inspection and management to animal management personnel for reducing society cost and effectively controlling social problems caused by stray animals, is a highly urgent issue in the related industry.

SUMMARY OF THE INVENTION

In view of the disadvantages of the prior art mentioned above, a primary objective of the present invention is to provide an animal management system and a scanning access device for accessing RFID label of animal body and providing instant inquiry about animal related information for convenient management.

Another objective of the present invention is to provide an animal management system and a scanning access device, which are capable of enabling animal management personnel to access RFID label on/in animal body in a remote distance, and thereby operate the scanning access device in a convenient and safe approach.

To achieve the aforementioned and other objectives, an animal management system and a scanning access device are provided according to the present invention. According to the animal management system, an RFID label for recording animal information is disposed on/in animal body, thereby enabling animal management personnel to identify animal identity and perform management procedure based on the RFID label. The system comprises: a communication transmission module; a scanning access device, which comprises a first access module, an interface, an input module, a processing module, a display module, and a transmitting/receiving module, wherein the first access module is for accessing information saved in the RFID label disposed on/in animal body; the interface is for the first access module to be coupled thereto and receiving the information saved in the RFID label accessed by the first access module; the input module is for receiving operation message; the processing module is for processing the information of the RFID label received by the interface and/or the operation message received by the input module to thereby obtain processed information; the display module is for displaying the processed information obtained from the processing module; and the transmitting/receiving module is for transmitting the processed information obtained from the processing module via the communication transmission module and/or receiving another information transmitted by the communication transmission module; and a data processing equipment with a database for recoding the animal information, configured for performing a comparison process on information transmitted by the transmission/receiving module with the animal information saved in the database, and subsequently transmitting the comparison outcome via the communication transmission module for enabling the transmitting/receiving module of the scanning access device to receive the comparison outcome.

The scanning access device of the present invention is for accessing information of an RFID label disposed on/in animal body and then transmitting the accessed and processed information of the RFID label to animal management system for comparison, thereby enabling animal management personnel to identify animal identity and perform management procedure. The scanning access device comprises: a first access module for accessing the information of the RFID label disposed on/in animal body; an interface for the first access module to be coupled thereto and receiving the information of the RFID label accessed by the first access module; an input module for receiving operation message; a processing module for processing the information of the RFID label received by the interface and/or the operation message received by the input module to thereby obtain processed information; a display module for displaying the processed information obtained from the processing module; and a transmitting/receiving module for transmitting the processed information obtained from the processing module via the communication transmission module and/or receiving another information transmitted by the communication transmission module.

In another embodiment of the scanning access device of the present invention, the first access module of the scanning access device has a connecting port for connection to an external device. The scanning access device further comprises a second access module for accessing the information saved in the RFID label disposed on/in animal body, and the second access module is capable of freely plugging in/unplugging from the connecting port of the first access module. The second access module is formed into a rod-shaped body. One end of the rod-shaped body is connected with a contractible element such that through the contractible element, the second access module, which is plugged in the connecting port of the first access module, is able to resiliently extend outward.

According to the prior art, a conventional scanning access device can only save accessed chip information in memory thereof and cannot transmit the information back to the data processing equipment instantly or receive the animal information. Compared with the prior art, the animal management system of the present invention is characterized by adopting the scanning access device having communication function to upload scanned chip information to the data processing equipment, thereby solving drawbacks of the prior art scanning access device, and enhancing animal management efficiency. In addition, the second access module of the scanning access device of the present invention is capable of scanning animal chip in a remote distance, thereby enhancing operation security for animal management personnel and preventing dangerous situation from happening to the personnel while operating vaccination and inspection process or collecting animal information. Therefore, the animal management system and the scanning access device of the present invention provide higher management efficiency and operation convenience.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, one of ordinary skill in the art can readily realize other advantages and effects of the present invention according to the disclosed specification. The present invention can also be performed or applied by other different embodiments. The details of the specification can be modified and varied based on different viewpoints and applications without departing from the spirit of the present invention.

It should be noted herein, attached diagrams are only simplified schematic diagrams illustrating basic architecture of the present invention. Accordingly, only elements related to the present invention are labeled in said diagrams. In addition, same element in different embodiments illustrated in the diagrams is labeled with same numeral symbol.

Figure 1:
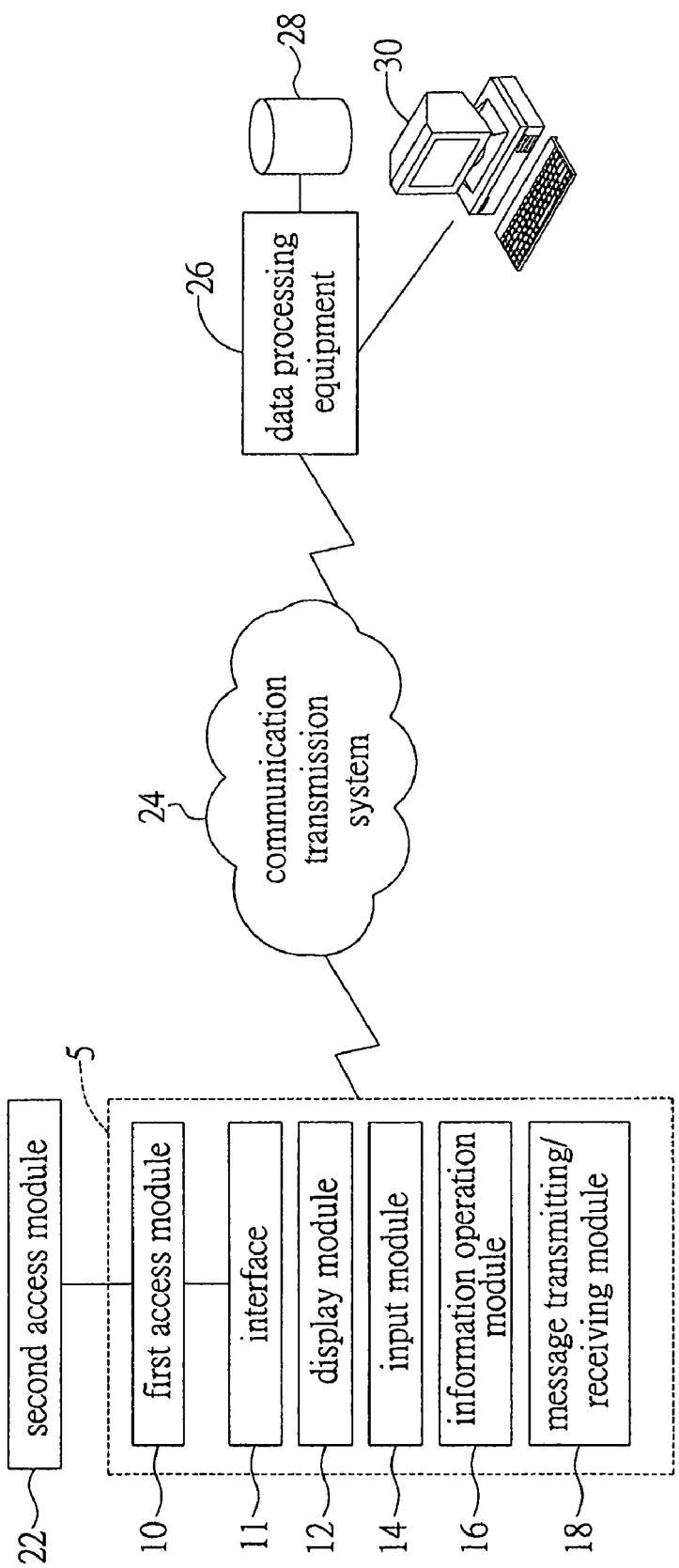
FIG. 1 is a block diagram illustrating the basic architecture of animal management system of the present invention.

The animal management system of the present invention is characterized by disposing an RFID label for recording animal information on/in animal body, thereby enabling animal management personnel to identify animal identity and perform management procedure. The operation of the animal management system is to scan the RFID label on/in the animal body via a scanning access device, and then transmit the animal information of the accessed RFID label via a communication transmission module directly to a data processing equipment for comparison, thereby enhancing efficiency of animal management system. The following illustrations are used for providing more specific description of the animal management system of the present invention. As shown in FIG. 1, a block diagram illustrating the basic architecture of the animal management system of the present invention is provided. This animal management system has a scanning access device 5, a communication transmission module 24, and a data processing equipment 26.

The scanning access device 5 is configured for accessing the information saved in the RFID label disposed on/in animal body, so as to thereby transmit the accessed information of the RFID label to an equipment of animal management system via the communication transmission module 24 after processing the accessed information. The scanning access device 5 is capable of providing function of, e.g. personal digital assistant (PDA). And the scanning access device 5 comprises a first access module 10, an interface 11, an input module 14, a processing module 16, a display module 12, and a transmitting/receiving module 18.

The first access module 10 is coupled in a plug-in manner to the interface 11 of the scanning access device 5 for scanning and accessing the information saved in the RFID label disposed on/in the animal body. The first access module 10 in the present embodiment is a ring-shaped structure, and the inner side of the ring-shaped structure is provided with a connecting port for externally connecting other external device. An RFID antenna is encapsulated inside the ring-shaped structure. It should be noted herein that the ring-shaped structure provides wider field effect range and the scanning scope thereof is about between 10 cm to 15 cm Therefore, it is not necessary to nestle to the RFID label in animal body to scan and access the RFID label.

The display module 12 is a liquid crystal display (LCD) for displaying related messages including connection status between the scanning access device 5 and the data processing equipment 26, processing status of the RFID label accessed by the first access module 10, access failure of the first access module 10, status of transmitting/receiving message, etc.

The input module 14 is an input keyboard for a user to input required operation. Content of the operation includes configuration setting of the scanning access device 5 and communication protocol setting of connection between the scanning access device 5 and the data processing equipment 26 so as to perform input operation according to information displayed by the display module 12. The input operation also includes activating scanning, inputting management personnel code, and transmitting the information of the RFID label scanned by the first access module 10.

The processing module 16 is for processing information of the RFID label accessed by the first access module 10 and/or operation message received after operation of the input module 14, so as to obtain processed information the processing operated by the processing module 16 includes performing encryption process on the accessed RFID with encryption techniques such as SAM module, SSL, etc., thereby forming encrypted RFID label to avoid the leak of information. However, the necessity of performing encryption process on information depends on application demand.

The transmitting/receiving module 18 employs, for example, general packet radio service (GPRS) technology for outwardly transmitting the processed information by the processing module 16 via the communication transmission module 24. The communication transmission module 24 is a transmission module employing wired or wireless transmission technologies, such as general packet radio service (GPRS), code division multiple access (CDMA), wideband code division multiple access (WCDMA), Internet, etc.

The data processing equipment 26 comprises information equipments, such as server 30 and database 28, for processing information transmitted from the transmitting/receiving module 18. And the processing steps performed by the data processing equipment 26 include decrypting the encrypted information transmitted by the transmitting/receiving module 18 of the scanning access device 5, comparing the decrypted information with information saved in the database 28, and transmitting comparison outcome back to the scanning access device 5. In addition, the data processing equipment 26 also provides services for certified animal management personnel, vaccination and inspection personnel, related authorized units, and even general public to inquire about updated status and related information of the animal, and further provides basic information to authorized management unit for subsequent inquiry and billing process.

The scanning access device 5 optionally further comprise a second access module 22, and the second access module 22 can be freely plugged in/unplugged from the connecting port of the first access module 10 for accessing the RFID label and also transmitting the information of the RFID label to the processing module 16. Besides, the second access module 22 is formed into a long rod-shaped body, thereby enabling animal management personnel to scan the RFID label on the animal body in a remote distance.

Figure 2:
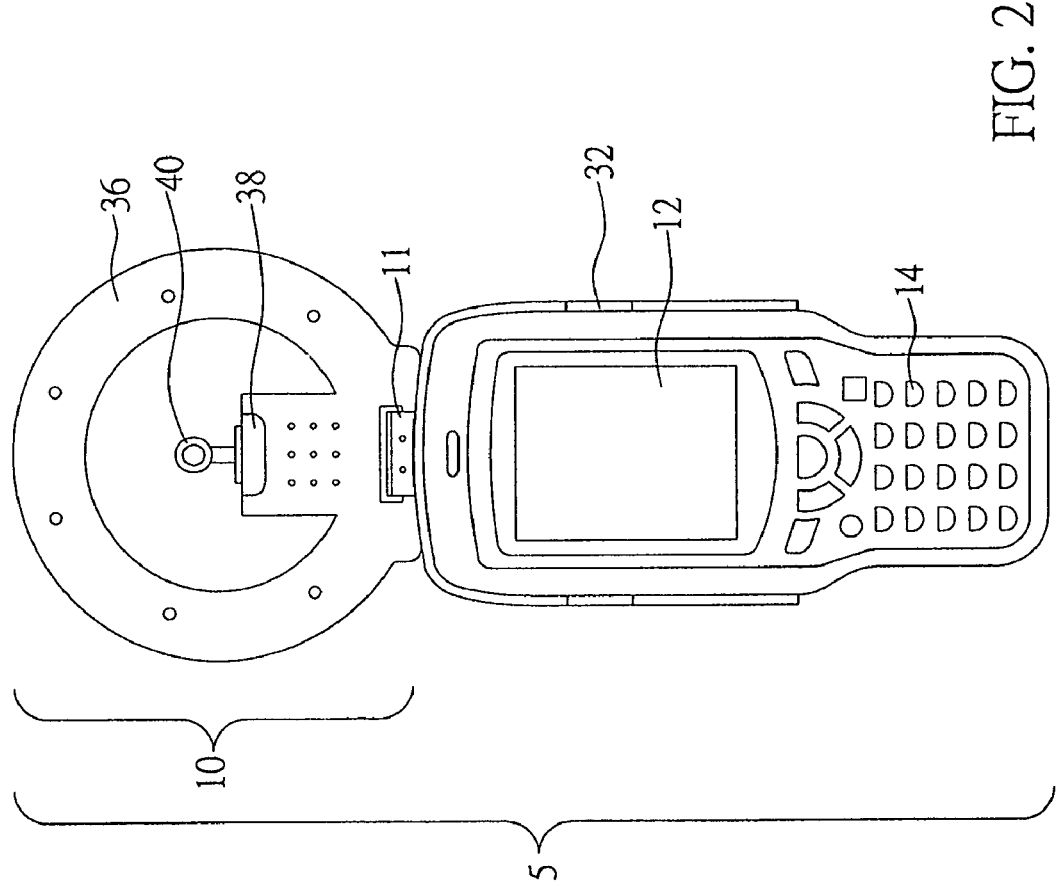
FIG. 2 is a schematic view of the scanning access device of the present invention.

Referring to FIG. 2, a schematic view of the scanning access device of the present invention is shown. When also referring to FIG. 1, the first access module 10 is shown to be coupled to the interface 11 of the scanning access device 5. In the present embodiment, the first access module 10 is a ring-shaped hollow structure 36, and the inner side of the ring-shaped hollow structure 36 is provided with a connecting port 38 for externally connecting with the second access module 22. The ring-shaped hollow structure 36 further has a covering cap 40 for covering up the connecting port 38, thereby protecting the connecting port 38 from dust when the connecting port 38 is not connected with the second access module 22. In addition, the first access module 10 has an RFID antenna received inside the ring-shaped hollow structure 36, so as to provide the first access module 10 with a wider field range. Therefore, while scanning the RFID label in a close distance, the animal management personnel is able to scan and access the RFID label without contacting animal directly with the first access module 10. The scanning distance between the first access module 10 and the RFID label of the animal can be up to between 10 cm to 15 cm.

By using the display module 12 of the scanning access device 5, e.g. a LCD screen, the scanning access device 5 is able to display various input/output information. The input module 14 of the scanning access device 5, such as input keys, is used for inputting information including status setting of the scanning access device 5 and communication protocol setting of connection between the scanning access device 5 and the data processing equipment 26, and inputting commands for operation according to information displayed by the display module 12. The scanning access device 5 also has scanning keys 32 arranged on both sides thereof for activating scanning procedure of the scanning access device 5, outward transmitting the scanned and accessed information, and receiving message transmitted back after being compared with information saved in the database 28 by the data processing equipment 26 via the transmitting/receiving module 18 of the scanning access device 5. It should be noted herein that information or message transmitted between the scanning access device 5 and the data processing equipment 26 can be encrypted information or message depending on practical application demand.

Figure 3:
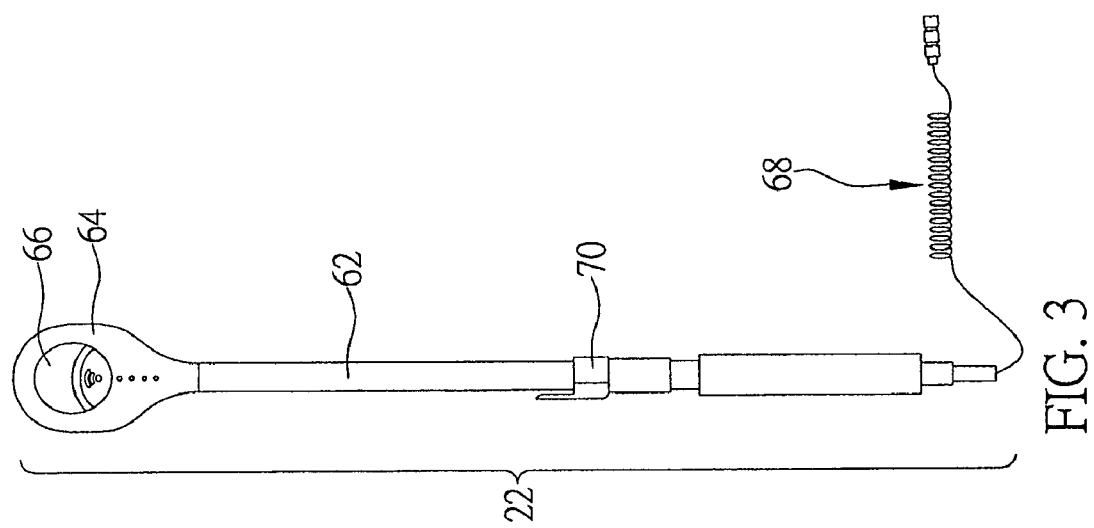
FIG. 3 is a schematic view of the second access module of the scanning access device of the present invention.

Referring to FIG. 3, a schematic view of the second access module of the scanning access device of the present invention is shown. As shown in FIG. 3, the second access module 22 of the present embodiment is also formed into a rod-shaped body 62. The rod-shaped body 62 has an oval-shaped end 64 encapsulating an access element and an RFID antenna electrically connected therewith (not shown in FIG. 3), and a transmission element disposed inside the rod-shaped body 62 such that the information of the RFID label accessed by the access element is transmitted to the first access module 10 by the transmission element and the information of the RFID label is transmitted from the first access module 10 to the interface 11. The material for encapsulating the access element, the RFID antenna, and the transmission element is a plastic material, and the plastic material is thermo-plastic selected from the group consisting of ABS, PE, PP, and PVC. Besides, the oval-shaped end 64 can be an oval-shaped hollow structure 66. The other end of the rod-shaped body 62 is connected with a contractible element 68. The transmission element is disposed inside the contractible element 68, and the contractible element 68 enables the second access module 22 plugged in the connecting port 38 of the first access module 10 to resiliently extend outward, thereby providing an easy way of operating the second access module 22. The scanning access device 5 that has the second access module 22 plugged therein enables the animal management personnel to scan and access the RFID label on animal in a remote distance. In addition, the second access module 22 also comprises a snap hook 70, which is for attaching the second access module 22 to belt of the animal management personnel when the second access module 22 is not plugged and disposed into the connecting port 38 of the first access module 10.

Figure 4:
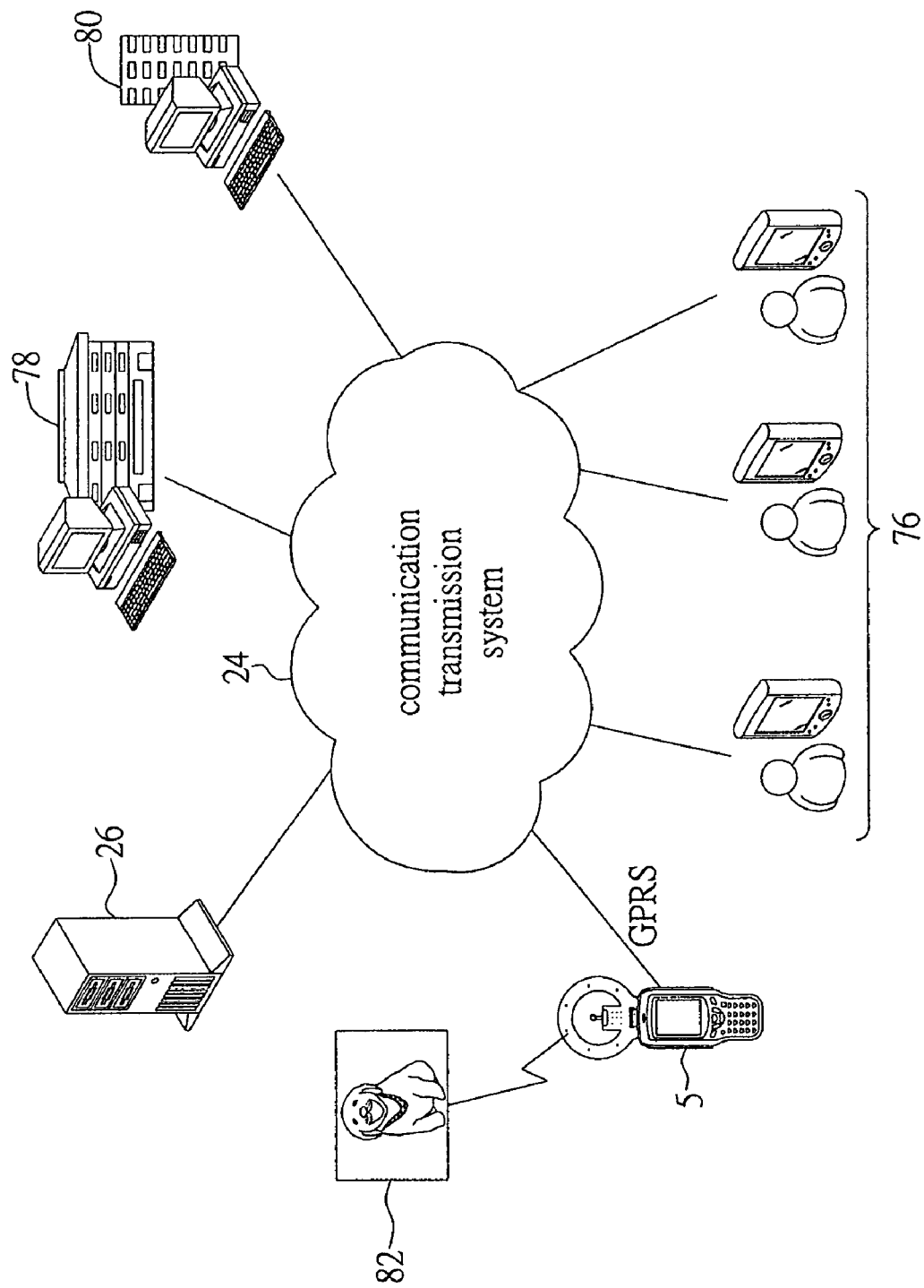
FIG. 4 is a diagram illustrating the preferred application architecture of the animal management system of the present invention.

Referring to FIG. 4, a schematic diagram illustrating application architecture of a preferred embodiment of the animal management system of the present invention is shown. It should be noted herein that a dog is used as managed object in following embodiment for providing a plain description of application architecture of animal management system of the present invention. However, the application scope of the animal management system of the present invention is not limited to a dog or process steps in the following embodiment. As shown in FIG. 4, the animal management system of the present embodiment mainly comprises a scanning access device 5 and a data processing equipment 26. In a practical application, while the owner has a new dog or producing puppies, he must go to operation company office 80 for applying license and paying tax in order to obtain a dog tax receipt, and subsequently must bring the dog and the dog tax receipt to a veterinary hospital 78 for an examination on rabies or related diseases. If there are no related diseases, the dog is allowed to be injected with chip, wherein an RFID injection technology is adopted to inject the RFID label into animal hypodermis or selectively embed the RFID label in a collar wearable on animal such that the registration of dog ID information is completed. The veterinary hospital 78 subsequently uploads the dog ID information to the data processing equipment 26 for enabling animal management personnel to perform inspection on the animal and providing related personnel and general public for on-line inquiry via information terminal equipments 76.

After completing of the chip implantation and registration of dog ID information, the dog thus has determined ID certification. Since the RFID label comprises at least RFID chip code, animal feeding permit, birth date, maternal identification, paternal identification, watch status, vaccination and inspection record, and other information, the dog has an ID for being identified in the future. After dog registration has been done in an appointed location, inspection personnel can bring the scanning access device 5 anywhere anytime for inspection. For instance, when the inspection personnel finds a stray dog 82 at park, the inspection personnel is able to differentiate if the stray dog is implanted with an RFID chip by using the scanning access device 5 to scan the stray dog 82. First of all, the inspection personnel presses down a scanning key 32 of the scanning access device 5. At this moment, the scanning access device 5 gives a prompt to the inspection personnel by means of flashing light and/or vibration and/or displaying message on screen, and then the inspection personnel makes the first access device 10 of the scanning access device 5 approach within a range to perform scanning. If the stray dog 82 is a fierce big dog, the inspection personnel can selectively plug the second access module 22 into the connecting port 38 of the first access module 10, wherein the covering cap 40 has to be pulled off for enabling the second access module 22 to plug in the connecting port 38, thereby enabling the inspection personnel to scan and access the fierce big dog in a remote distance for protection and providing a purpose of intimidating the fierce big dog by the rod-shaped body of the second access module 22.

After scanning and accessing the RFID label, an encryption process is performed by the processing module 16 of the scanning access device 5. Subsequently, the transmitting/receiving module 18 transmits the encrypted information via the communication transmission module 24 to the data processing equipment 26 for a decryption process, and then decrypted information are compared with information saved in the database 28 of the data processing equipment 26. If the scanned RFID label has a record in the database 28, related information of the comparison outcome is transmitted back to the scanning access device 5 by the data processing equipment 26. After the transmitting/receiving module 18 of the scanning access device 5 receives the message transmitted back, the display module 12 of the scanning access device 5 displays related animal message and picture. If the message indicates that the stray dog 82 is a reported missing dog, the inspection personnel will inform owner; otherwise, if the RFID label has no corresponding record found in the database 28, the display module 12 displays message of no related information according to information transmitted back from the data processing equipment 26. At this moment, the inspection personnel will inform related authorized unit to take the stray dog back for subsequent management procedure. On the other hand, if the scanning access device 5 cannot scan/access the RFID label, the display module 12 displays message of label accessing failure according to information transmitted back from the data processing equipment 26. At this moment, the inspection personnel will inform related authorized unit to take the stray dog back for further management procedure likewise.

In another application of the animal management system of the present invention, the inspection personnel is able to randomly inspect a dog walked by owner and request for a scan of chip information of the dog. If chip information is scanned and a dog tax has been paid, then he can let go the owner and the dog; otherwise, if the dog tax has not been paid, then he can keep the dog and request the owner to pay for the dog tax. Besides, if the dog has not been implanted with a chip, then he can keep the dog and fine the owner as well.

Accordingly, the conventional scanning access device is not directly connected with a data processing equipment, and the scanning access device must be very close to dog for accessing chip information. Compared with the prior art, the animal management system of the present invention is capable of effectively solving drawbacks of the prior art. The animal management system and scanning access device of the present invention enable the inspection personnel to obtain the chip information without having to close to the dog, and they are also capable of receiving related information of the dog via connection to the data processing equipment. Therefore, the animal management system and scanning access device of the present invention are capable of not only enhancing inspection efficiency on animals, but also providing method of secure and convenient operation for scanning animal chip in a remote distance.

The foregoing embodiments are only illustrated to disclose the features and functions of the present invention, not to restrict the scope of the present invention, the practical implementations can also have different embodiment with different ordinance in each region. It should be understood to one of ordinary skill in the art that all modifications and variations according to the spirit and principle in the disclosure of the present invention should fall within the scope of the appended claims.

What is claimed is:

1. An animal management system for recording animal information by disposing an RFID label on/in animal body, thereby enabling animal management personnel to identify animal identity and perform management procedure, the system comprising:
   a communication transmission module;
   a scanning access device comprising:
   a first access module for accessing information saved in the RFID label disposed on/in the animal body;
   an interface for the first access module to be coupled thereto so as to receive the information of the RFID label accessed by the first access module;
   an input module for receiving an operation message;
   a processing module for processing the information received by the interface and/or the operation message received by the input module to thereby obtain processed information;
   a display module for displaying the processed information processed by the processing module; and
   a transmitting/receiving module for transmitting the processed information obtained from the processing module via the communication transmission module and/or receiving another information transmitted by the communication transmission module; and
   a data processing equipment with a database for recording the animal information, the data processing equipment being for receiving the processed information transmitted from the transmitting/receiving module, performing a comparison process for comparing the received information with the animal information saved in the database, and transmitting comparison outcome via the communication transmission module for enabling the transmitting/receiving module of the scanning access device to receive the comparison outcome.

2. The animal management system of claim 1, wherein the communication transmission module comprises general packet radio service (GPRS), code division multiple access (CDMA), wideband code division multiple access (WCDMA), and Internet.

3. The animal management system of claim 1, wherein the first access module is a ring-shaped structure having a connecting port for connection with an external device and an RFID antenna disposed therein.

4. The animal management system of claim 3, wherein the connecting port is for a second access module to be coupled thereto, allowing the second access module to access the RFID label disposed on/in the animal body, and the interface is for receiving information of the RFID label accessed by the second access module via the first access module.

5. The animal management system of claim 4, wherein the second access module is formed into a rod-shaped body.

6. The animal management system of claim 5, wherein one end of the rod-shaped body is oval-shaped and encapsulates an access element and an RFID antenna electrically connected to the access element, and a transmission element is further disposed inside the rod-shaped body, such that information of the RFID label accessed by the access element is transmitted by the transmission element to the first access module, and the information of the RFID label is transmitted to the interface by the first access module.

7. The animal management system of claim 6, wherein the oval-shaped end of the rod-shaped body is a hollow structure.

8. The animal management system of claim 6, wherein another end of the rod-shaped body is connected with a contractible element, the transmission element is disposed inside the contractible element, and the contractible element is allowed to enable the second access module coupled to the connecting port of the first access module to resiliently extend outward.

9. The animal management system of claim 6, wherein the oval-shaped end that encapsulates the access element, the RFID antenna, and the transmission element is made of a plastic material.

10. The animal management system of claim 9, wherein the plastic material is a thermoplastic material selected from the group consisting of ABS, PE, PP, and PVC.

11. A scanning access device for accessing information of an RFID label disposed on/in animal body and transmitting the information to an animal management system via a communication transmission module after processing the information for performing a comparison process, thereby enabling an animal management personnel to identify animal identity and perform management procedures, the scanning access device comprising:
 a first access module for accessing the information of the RFID label disposed on/in the animal body;
 an interface for the first access module to be coupled thereto and receiving the information of the RFID label accessed by the first access module;
 an input module for receiving an operation message;
 a processing module for processing the information received by the interface and/or the operation message received by the input module to thereby obtain processed information; and
 a transmitting/receiving module for transmitting the processed information obtained from the processing module via the communication transmission module and/or receiving another information transmitted by the communication transmission module.

12. The scanning access device of claim 11, wherein the communication transmission module comprises general packet radio service (GPRS), code division multiple access (CDMA), wideband code division multiple access (WCDMA), and Internet.

13. The scanning access device of claim 11, wherein the first access module is a ring-shaped structure having a connecting port for connection with an external device and an RFID antenna disposed therein.

14. The scanning access device of claim 13, further comprising a second access module for accessing the RFID label disposed on/in animal body, wherein the second access module is capable of freely plugging in/unplugging from the connecting port of the first access module.

15. The scanning access device of claim 14, wherein the second access module is formed into a rod-shaped body.

16. The scanning access device of claim 15, wherein one end of the rod-shaped body is oval-shaped and encapsulates an access element and an RFID antenna electrically connected to the access element, and a transmission element is disposed inside the rod-shaped body, allowing information of the RFID label accessed by the access element to be transmitted by the transmission element to the first access module, and the information of the RFID label to be transmitted to the interface by the first access module.

17. The scanning access device of claim 16, wherein the oval-shaped body is a hollow structure.

18. The scanning access device of claim 17, wherein another end of the rod-shaped body is connected with a contractible element, the transmission element is disposed inside the contractible element, and the contractible element is allowed to enable the second access module plugged in the connecting port of the first access module to resiliently extend outward.

19. The scanning access device of claim 16, wherein the oval-shaped body that encapsulates the access element, the RFID antenna, and the transmission element is made of a plastic material.

20. The scanning access device of claim 19, wherein the plastic material is a thermoplastic material selected from the group consisting of ABS, PE, PP, and PVC.

* * * * *